United States Patent
Liu

(10) Patent No.: US 9,036,031 B2
(45) Date of Patent: May 19, 2015

(54) DIGITAL IMAGE STABILIZATION METHOD WITH ADAPTIVE FILTERING

(75) Inventor: Erwin Sai Ki Liu, San Carlos, CA (US)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 554 days.

(21) Appl. No.: 13/313,771

(22) Filed: Dec. 7, 2011

(65) Prior Publication Data

US 2012/0162452 A1 Jun. 28, 2012

Related U.S. Application Data

(60) Provisional application No. 61/426,970, filed on Dec. 23, 2010, provisional application No. 61/426,975, filed on Dec. 23, 2010.

(51) Int. Cl.
| | | |
|---|---|---|
| *H04N 5/228* | (2006.01) | |
| *H04N 5/14* | (2006.01) | |
| *H04N 5/232* | (2006.01) | |
| *G06T 7/20* | (2006.01) | |

(52) U.S. Cl.
CPC .......... *H04N 5/145* (2013.01); *H04N 5/23254* (2013.01); *G06T 7/2026* (2013.01); *G06T 7/2033* (2013.01); *G06T 7/2073* (2013.01); *G06T 2207/10016* (2013.01); *G06T 2207/20016* (2013.01); *G06T 2207/20021* (2013.01)

(58) Field of Classification Search
USPC .......................................... 348/208.4, 208.14
See application file for complete search history.

(56) References Cited

U.S. PATENT DOCUMENTS

| | | |
|---|---|---|
| 5,446,501 A | 8/1995 | Takemoto et al. |
| 5,608,458 A | 3/1997 | Chen et al. |
| 5,714,918 A * | 2/1998 | Menkhoff ................... 333/28 R |
| 6,424,676 B1 | 7/2002 | Kono et al. |
| 6,788,819 B1 | 9/2004 | Swann et al. |
| 7,043,058 B2 | 5/2006 | Cornog et al. |
| 7,447,337 B2 | 11/2008 | Zhang et al. |
| 8,508,605 B2 | 8/2013 | Dolgin et al. |
| 2002/0044693 A1 | 4/2002 | Ogawa |
| 2002/0150161 A1 | 10/2002 | Baese et al. |
| 2002/0154695 A1 | 10/2002 | Cornog et al. |
| 2002/0171759 A1 | 11/2002 | Handjojo et al. |
| 2003/0235248 A1 | 12/2003 | Kim et al. |
| 2004/0001147 A1 | 1/2004 | Vella et al. |
| 2004/0076333 A1 | 4/2004 | Zhang et al. |
| 2004/0252895 A1 | 12/2004 | Hur et al. |
| 2005/0105627 A1 | 5/2005 | Sun et al. |
| 2005/0163348 A1 | 7/2005 | Chen |
| 2006/0061658 A1 | 3/2006 | Faulkner et al. |
| 2006/0153472 A1 | 7/2006 | Sakata et al. |
| 2006/0228049 A1 | 10/2006 | Gensolen et al. |
| 2006/0256238 A1 | 11/2006 | Mishima et al. |
| 2006/0274834 A1 | 12/2006 | Hahn et al. |
| 2007/0116125 A1 | 5/2007 | Wada et al. |
| 2007/0288141 A1 | 12/2007 | Bergen et al. |

(Continued)

*Primary Examiner* — Roberto Velez
*Assistant Examiner* — Yih-Sien Kao
(74) *Attorney, Agent, or Firm* — F. Chau & Associates, LLC

(57) ABSTRACT

A Digital Image Stabilization method including selecting a Principal transform representing a stationary/background object in the scene of a video frame, based on scoring each of a plurality of transforms of tile motion vector (Tile MV) groups and of feature point motion vector (FP MV) groups, and excluding large moving objects based on the history of the stationary (background) group and the history of each of the plurality motion vector groups.

24 Claims, 12 Drawing Sheets

Adaptive filter block diagram.

(56) References Cited

U.S. PATENT DOCUMENTS

| | | |
|---|---|---|
| 2008/0107307 A1 | 5/2008 | Altherr |
| 2008/0144124 A1 | 6/2008 | Samadani et al. |
| 2008/0165852 A1 | 7/2008 | Zhang |
| 2008/0246848 A1 | 10/2008 | Tsubaki et al. |
| 2008/0273806 A1 | 11/2008 | Friedrichs et al. |
| 2008/0291285 A1 | 11/2008 | Shimizu |
| 2009/0028462 A1* | 1/2009 | Habuka et al. ............ 382/284 |
| 2009/0103620 A1 | 4/2009 | Lee et al. |
| 2009/0161827 A1* | 6/2009 | Gertner et al. ............... 378/65 |
| 2010/0074531 A1 | 3/2010 | Tanaka |
| 2010/0118156 A1 | 5/2010 | Saito |
| 2010/0157073 A1 | 6/2010 | Kondo et al. |
| 2010/0208087 A1 | 8/2010 | Ogawa |
| 2010/0220788 A1 | 9/2010 | Wittmann et al. |
| 2010/0245664 A1 | 9/2010 | Wu et al. |
| 2010/0260437 A1 | 10/2010 | Nguyen et al. |
| 2010/0271494 A1 | 10/2010 | Miyasako |
| 2011/0085049 A1 | 4/2011 | Dolgin et al. |
| 2011/0235942 A1 | 9/2011 | Luo et al. |
| 2011/0293195 A1 | 12/2011 | Nakagami et al. |
| 2011/0307537 A1* | 12/2011 | Hirayama ................... 708/301 |
| 2012/0147963 A1 | 6/2012 | Sato |
| 2012/0162449 A1 | 6/2012 | Braun et al. |
| 2012/0162450 A1 | 6/2012 | Park et al. |
| 2012/0162451 A1 | 6/2012 | Liu |
| 2012/0162452 A1 | 6/2012 | Liu |
| 2012/0162454 A1 | 6/2012 | Park et al. |
| 2012/0162475 A1 | 6/2012 | Lin et al. |
| 2012/0169894 A1 | 7/2012 | Numata et al. |
| 2012/0219229 A1 | 8/2012 | Springer et al. |
| 2012/0294492 A1 | 11/2012 | Kamei et al. |
| 2013/0033612 A1 | 2/2013 | Wu et al. |
| 2013/0083851 A1 | 4/2013 | Alshin et al. |
| 2013/0128974 A1 | 5/2013 | Chien et al. |

* cited by examiner

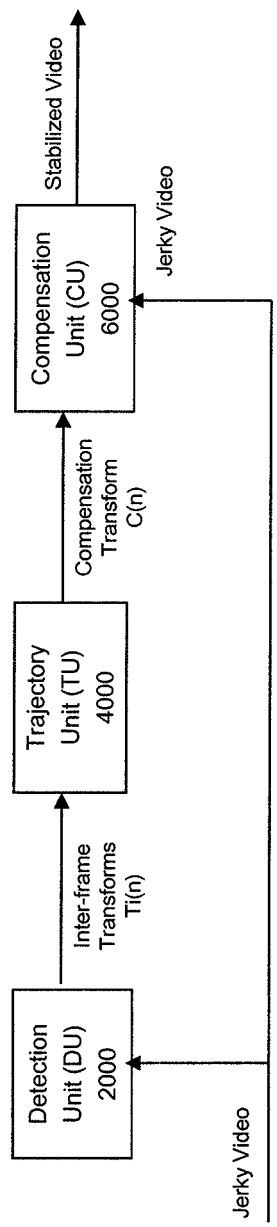
FIG. 1 Digital image stabilization circuit block diagram.

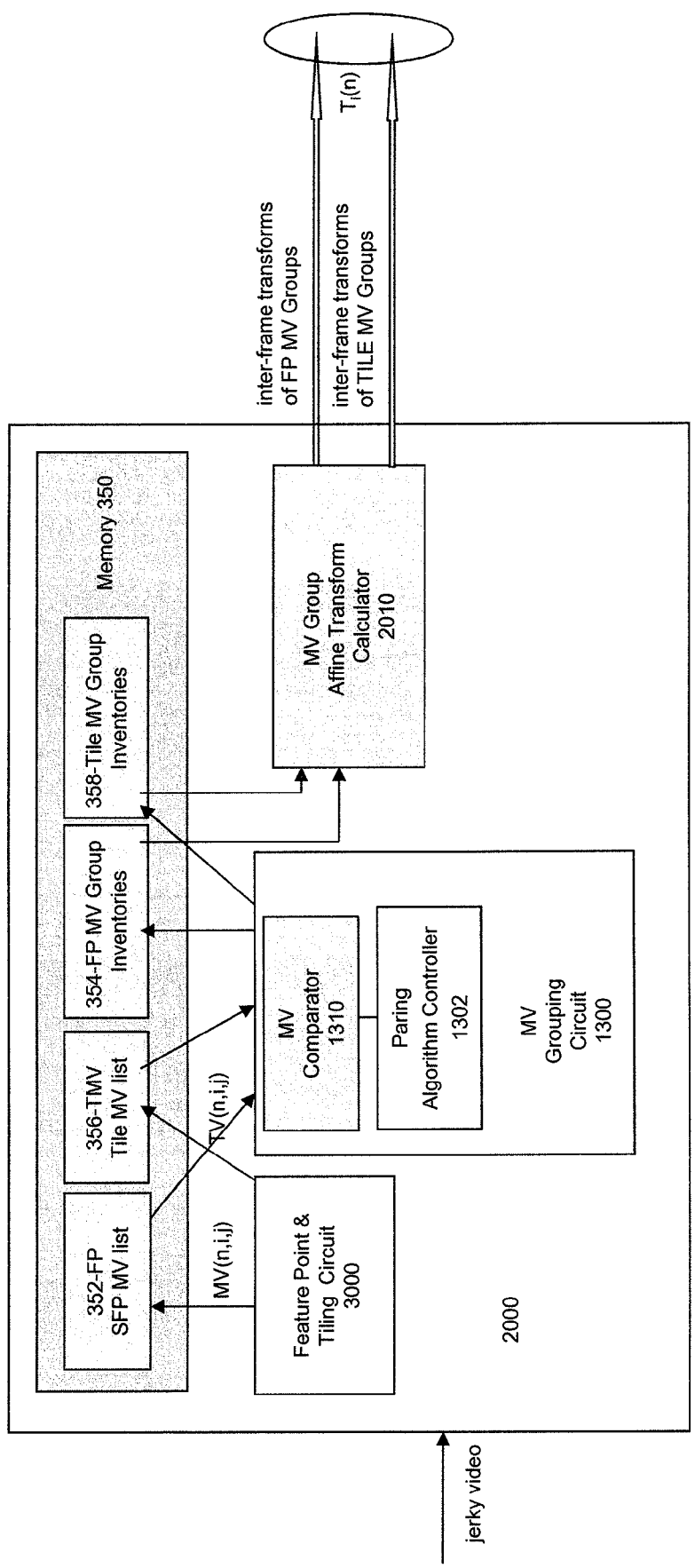
FIG. 2 Detection unit.

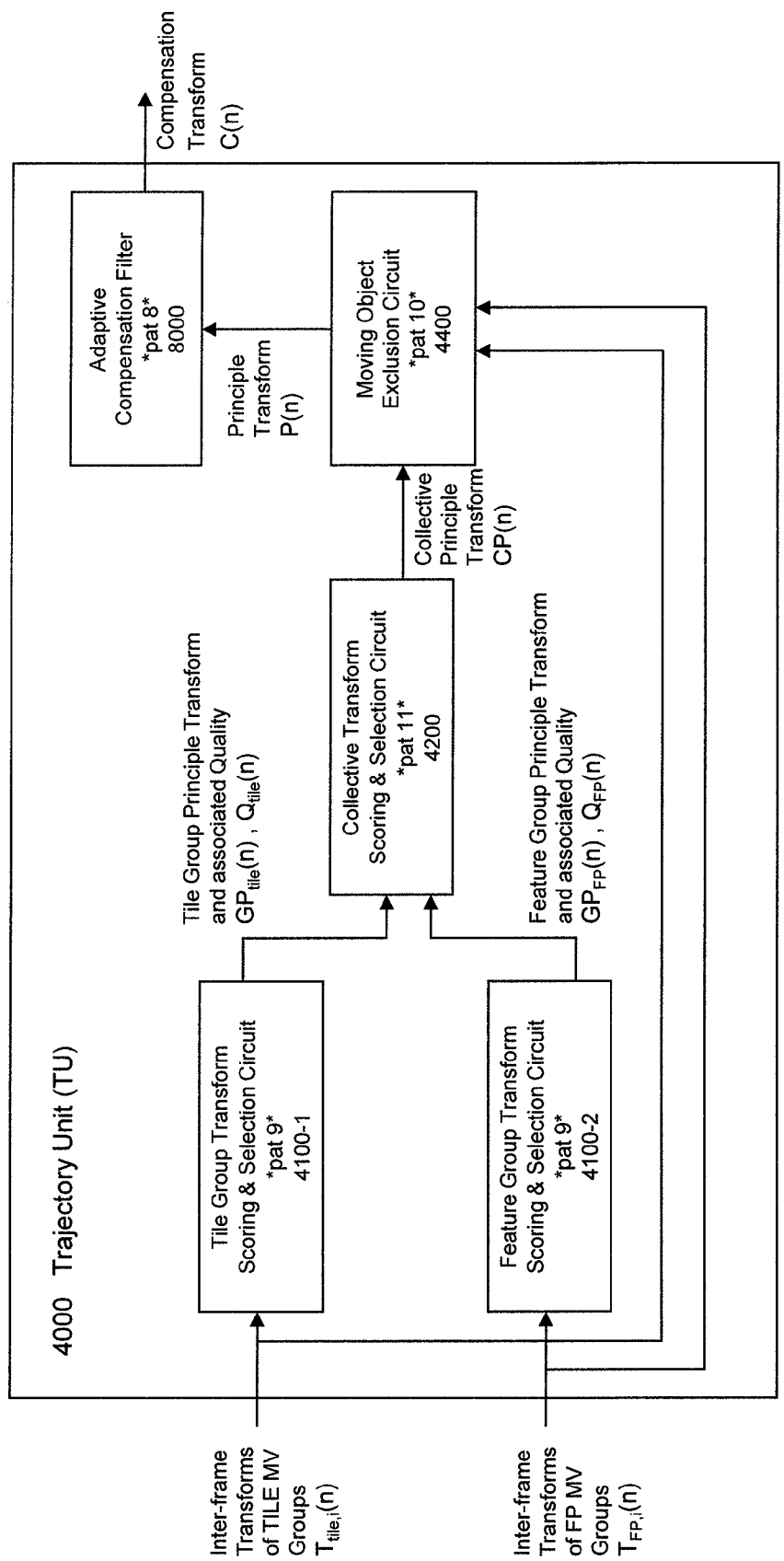
FIG. 3 Trajectory unit block diagram.

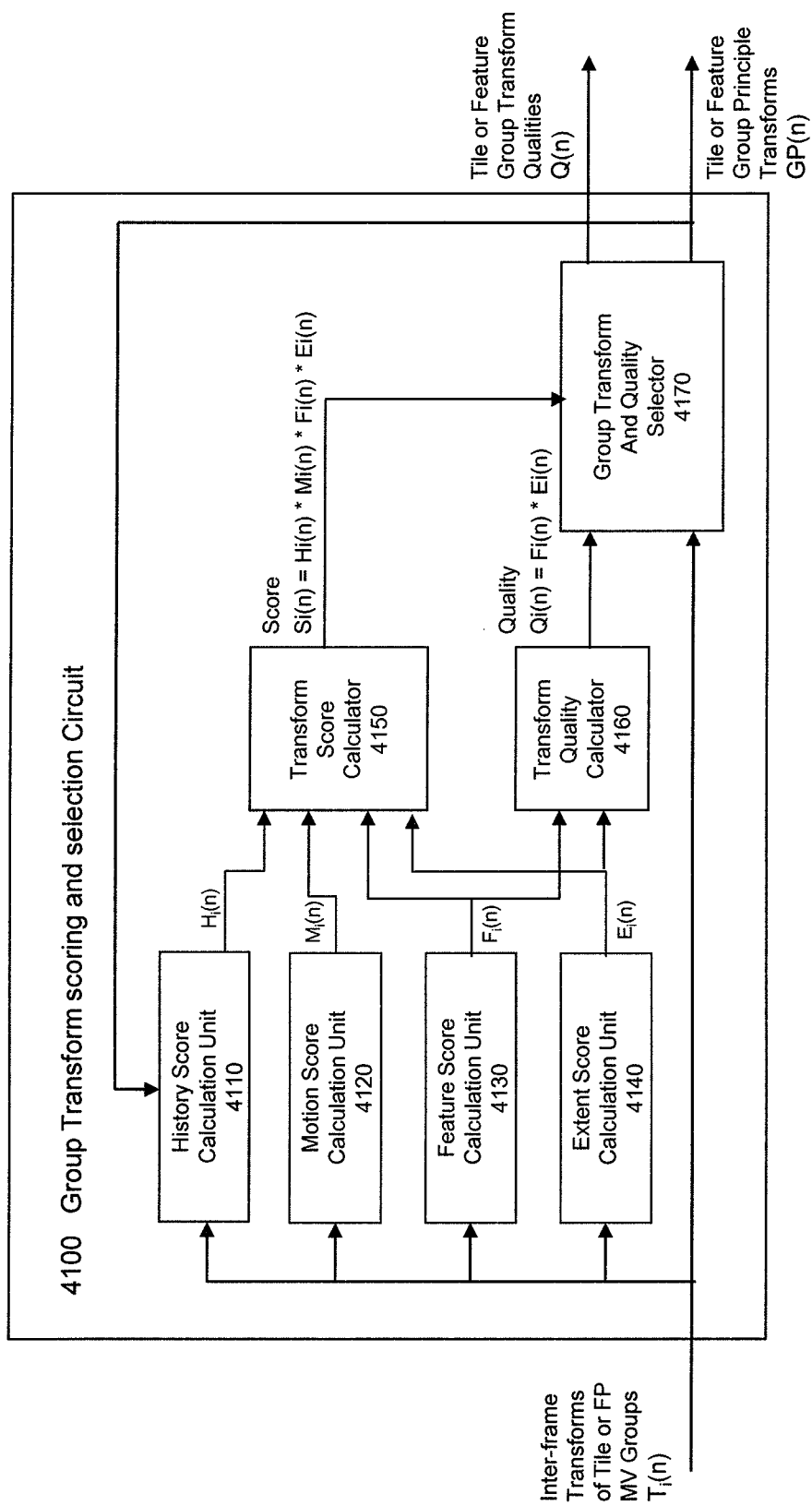
FIG. 4A Group transform scoring and selection block diagram.

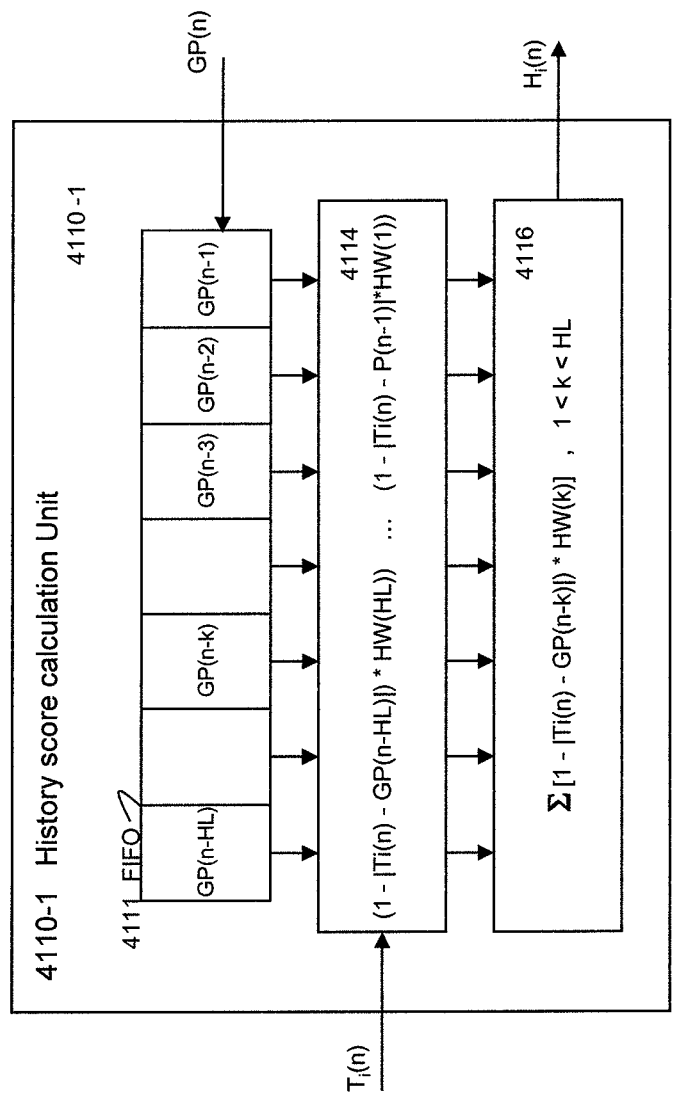
FIG. 4B  History score calculation unit.

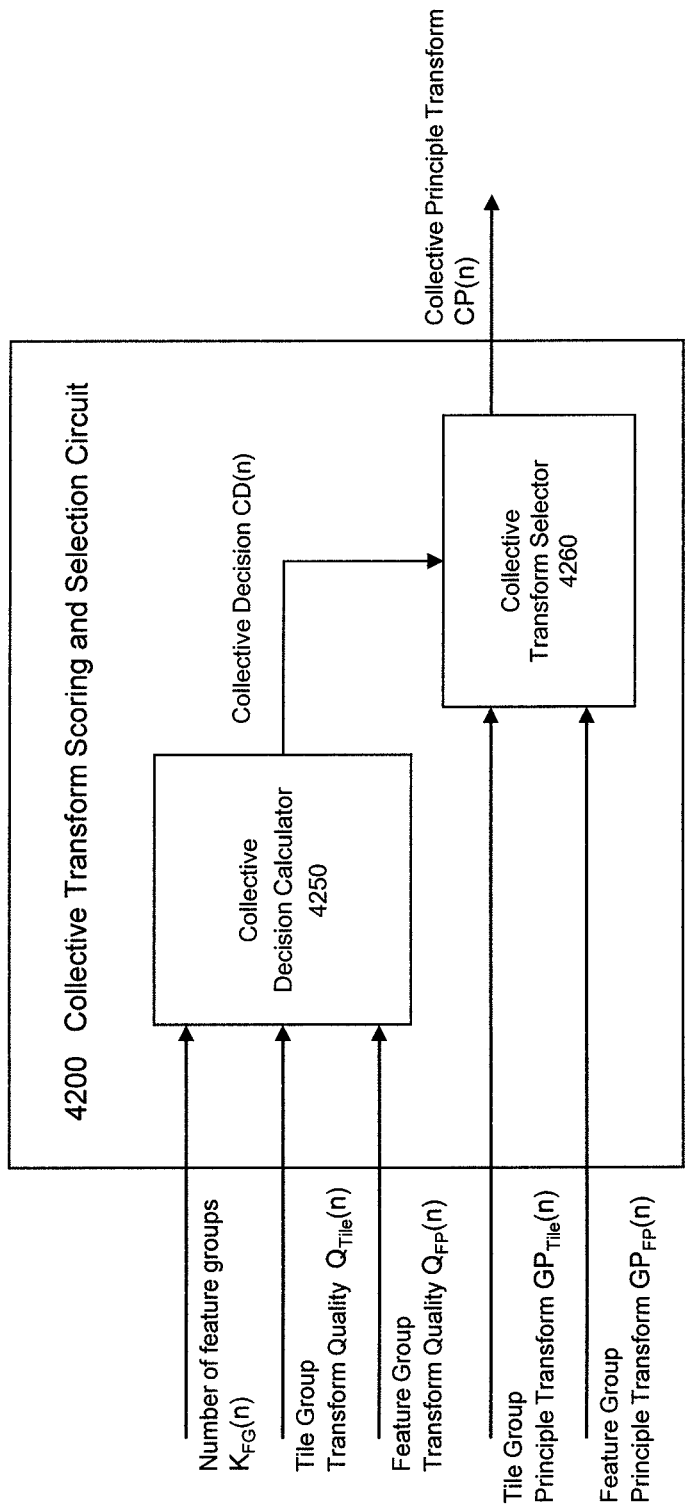
FIG. 5  Collective transform scoring and selection block diagram.

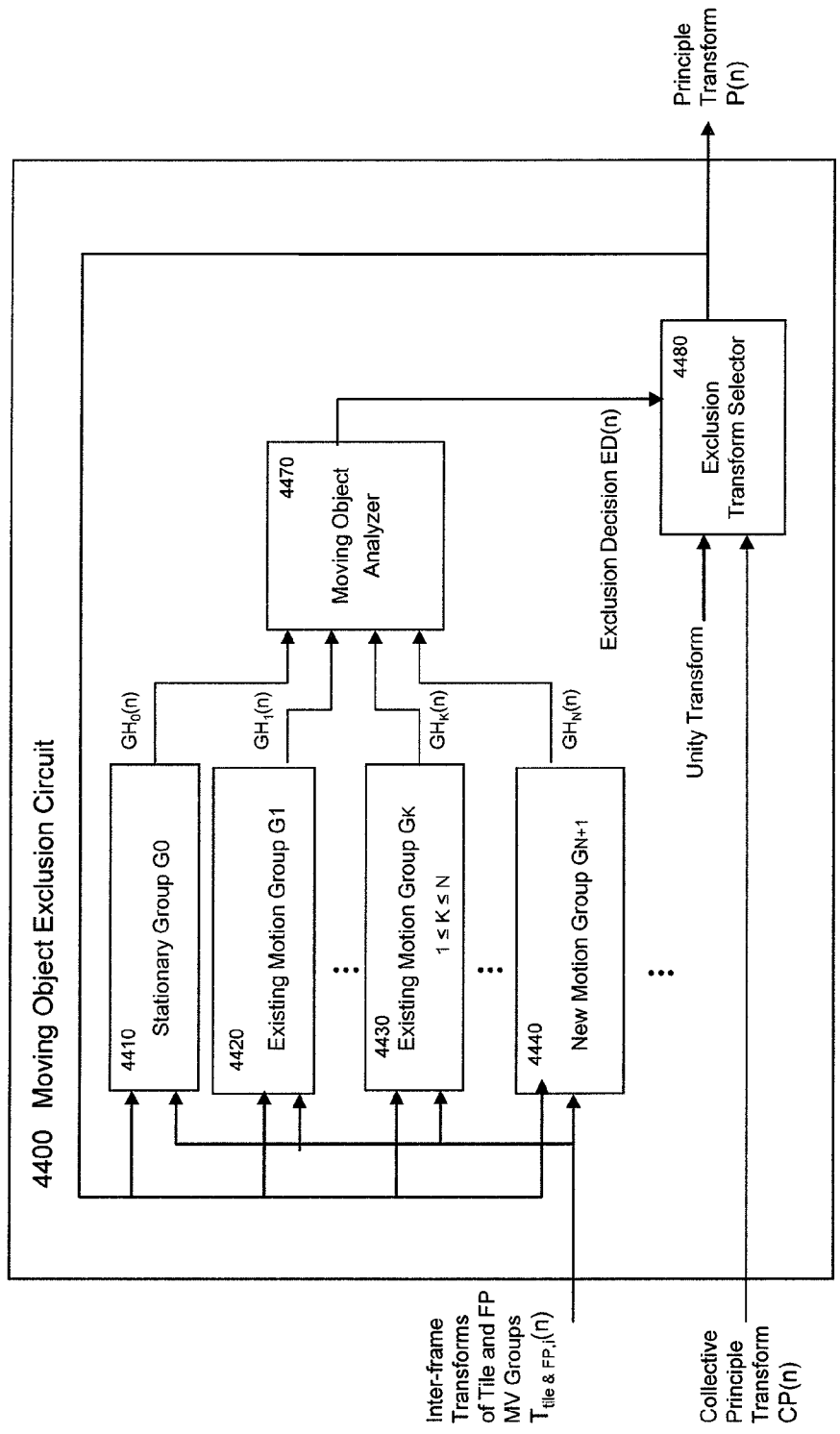
FIG. 6 Moving object exclusion method block diagram.

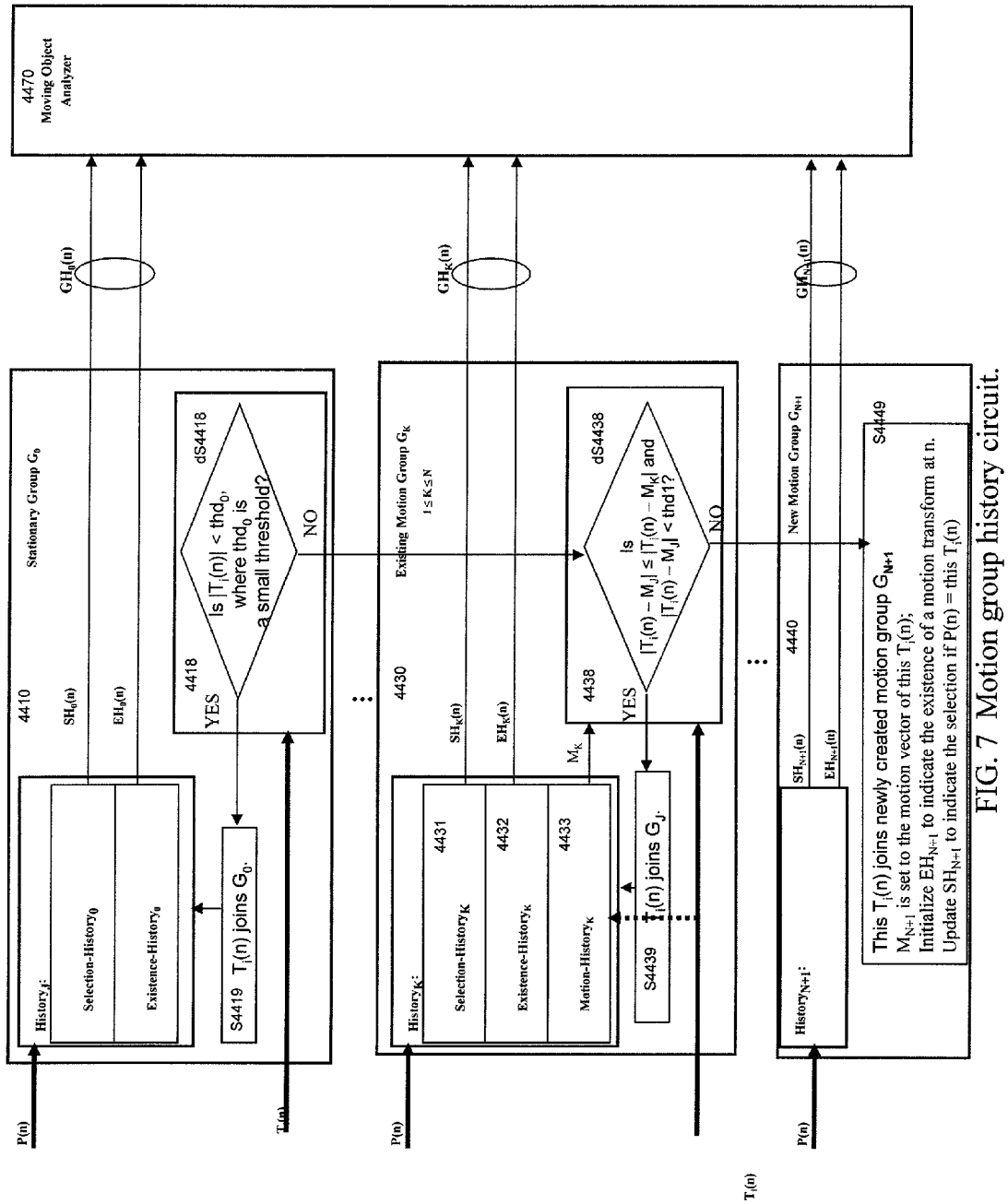
FIG. 7 Motion group history circuit.

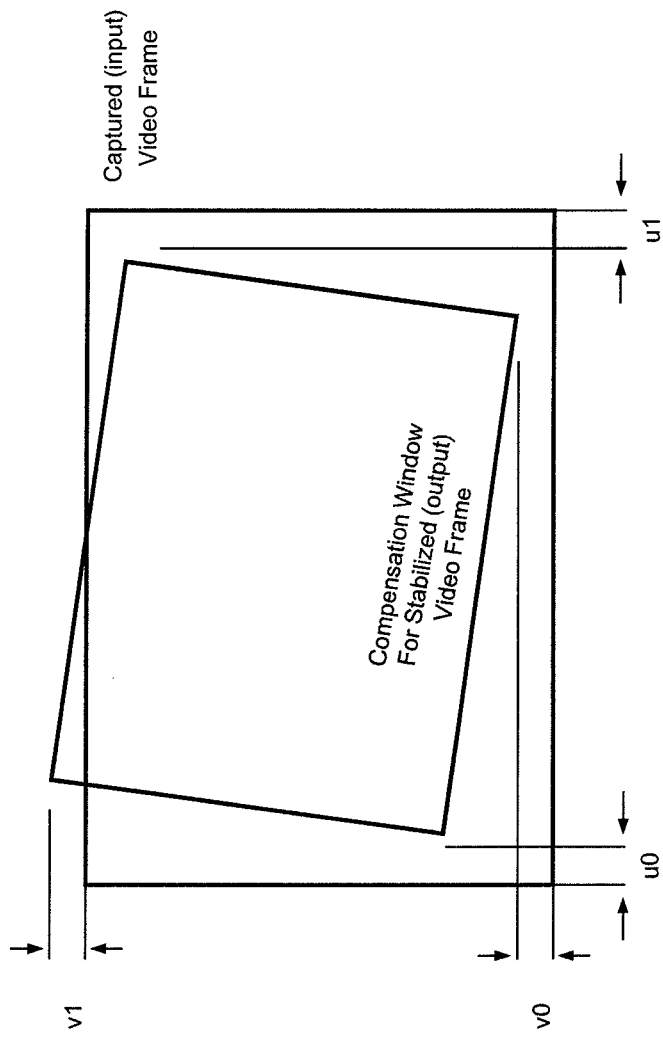
FIG. 8  Compensation window relating stabilized and captured frames.

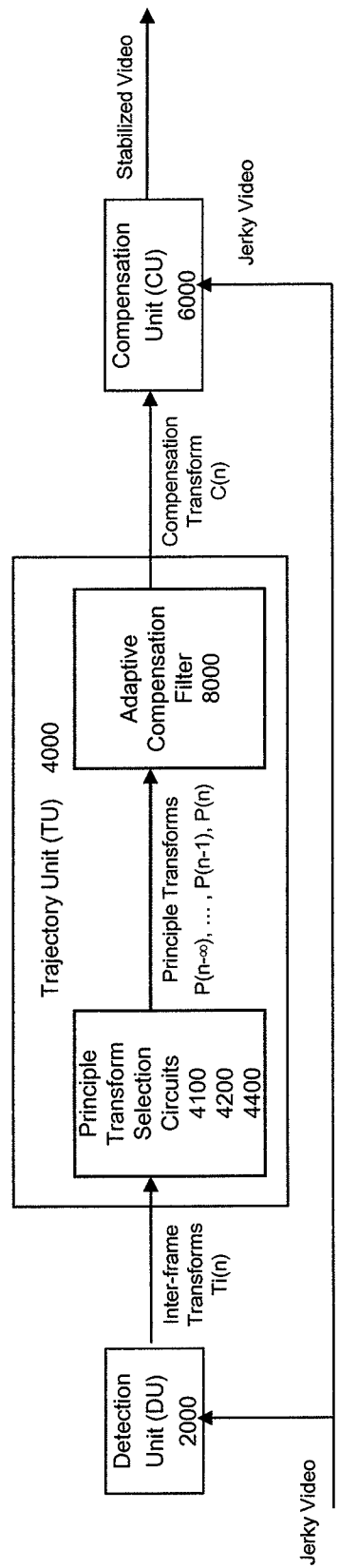
FIG. 9 Digital image stabilization circuit block diagram.

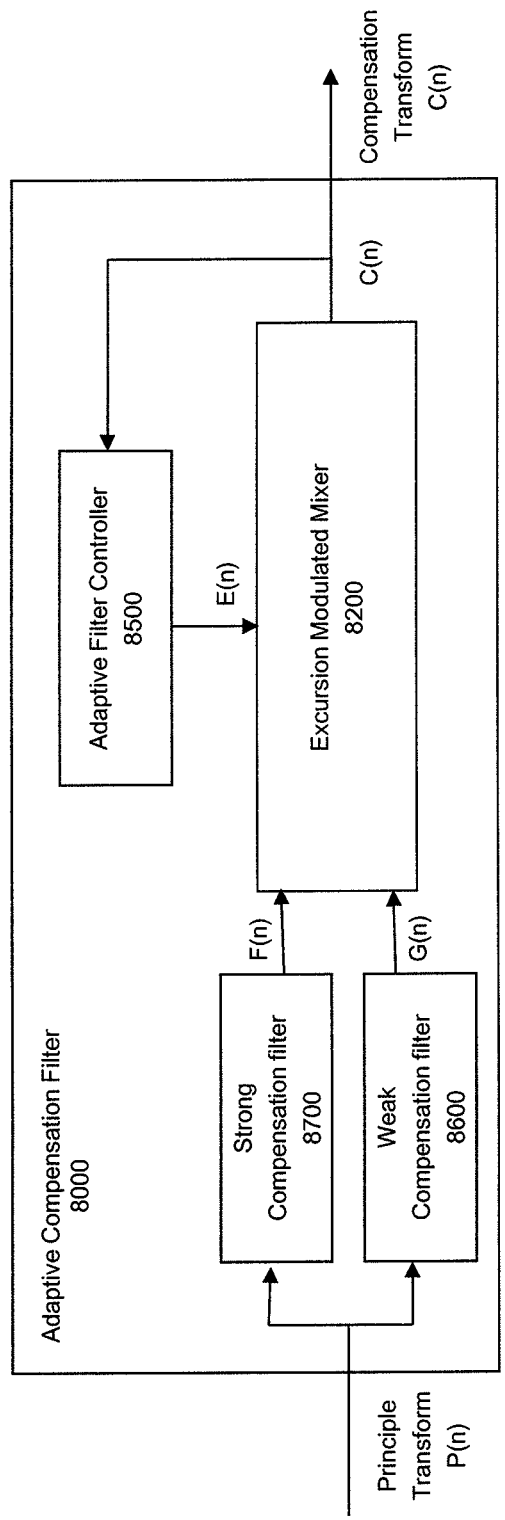
FIG. 10 Adaptive filter block diagram.

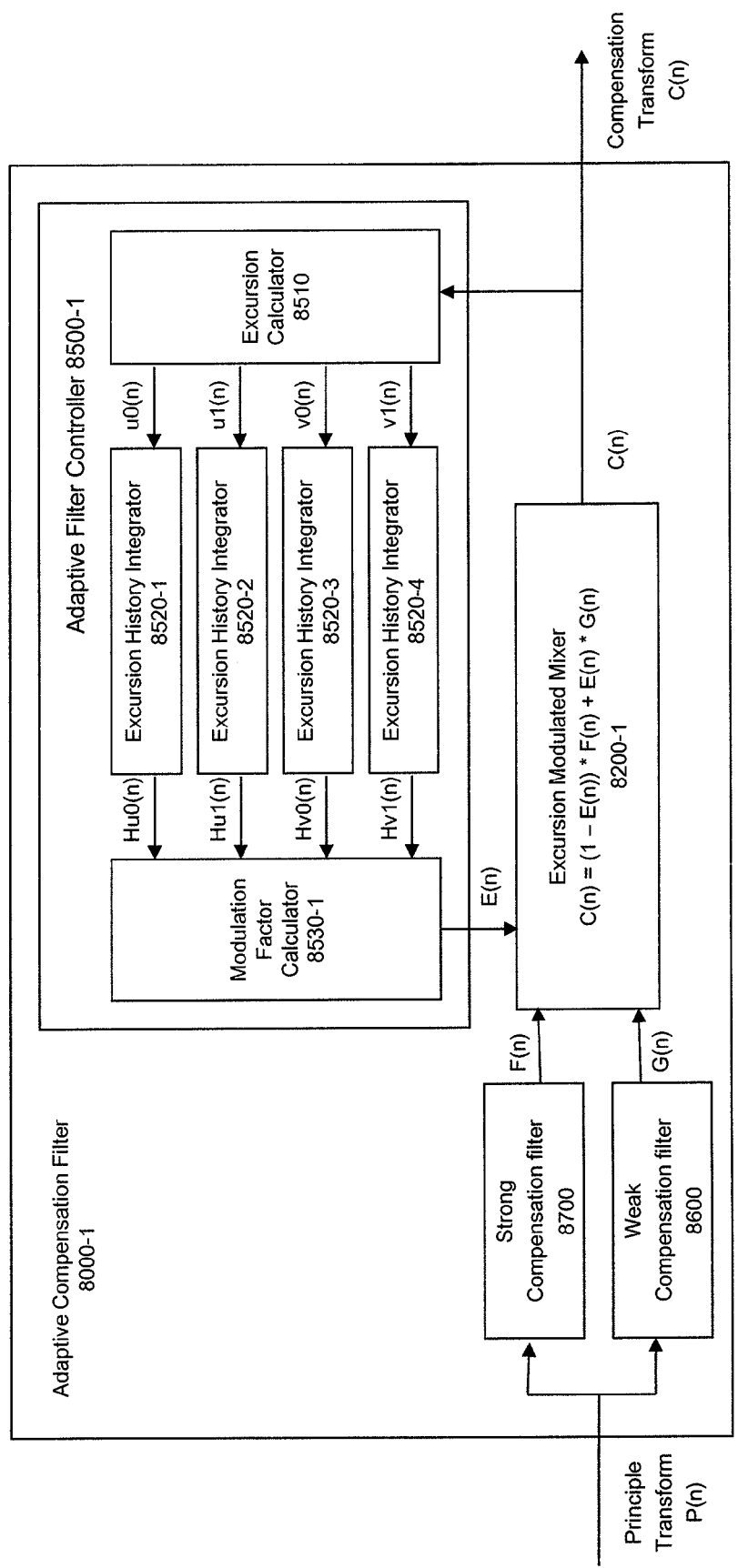
FIG. 11 An exemplary implementation of adaptive filter.

DIGITAL IMAGE STABILIZATION METHOD WITH ADAPTIVE FILTERING

CROSS-REFERENCE TO RELATED APPLICATION

This application claims priority under 35 U.S.C. §120 to U.S. Provisional Application No. 61/426,970, and 61/426,975, both filed in the U.S. Patent and Trademark Office on Dec. 23, 2010. The disclosures of both provisional applications are incorporated by reference herein.

TECHNICAL FIELD

The present inventive concept relates to digital image-stabilization (DIS), and more particularly, to a method of reducing over-excursions of compensation windows in captured video frames.

DISCUSSION OF THE RELATED ART

Digital cameras, digital video cameras and hand-held devices including such cameras are often employed to capture images or video while the camera is operated in the hand of a human operator. Thus, the video camera may be shaking or jittering in the operators hand while capturing the image or video. The jitter may be due to hand shaking or platform vibrations, and may include a horizontal component, a vertical component, a scaling component, and a rotational component. The jitter may make the hand-captured video distracting or disorienting for the viewer, and thus it is desirable to use digital circuits to digitally estimate camera trajectory (i.e., the jitter as detected between each pair of consecutive frames) and to filter out the jitter from a sequence of video frames of the same scene.

The video produced by a steady, either stationary or moving video camera contains mainly smooth motions (translation, rotation) in the captured video. On the other hand, an unsteady video camera produces video with high frequency jitter (translational and/or rotational) throughout the video images. The video produced by a steady, either stationary or moving video camera contains mainly smooth motions in the video. On the other hand, unsteady video camera produces videos with high frequency jitter throughout the video images.

A digital image stabilization (DIS) system first estimates unwanted (unintended) motion and then applies corrections to the image sequence. Accurate global motion estimation (camera trajectory estimation) is key to any video stabilization algorithm. The visual effect of a stabilized video is highly dependent on the quality of camera trajectory estimation. The global motion of the camera/scene is analyzed to distinguish between intended (e.g., panning) and unintended (jittery) global motion, and a compensation transform P(n) is generated to compensate for the unintended jittery motion. The video stabilization algorithm eliminates the jitter motion while keeping the user-intended camera motion. In general, jitter is caused by handshake and platform vibrations which will be faster (i.e., higher frequency) and nonlinear while camera motion will be slower and linear or monotonic. The global motion (cameral trajectory) vector is included in the affine transformation parameters of the compensation transform P(n) which are estimated between adjacent frames using matched feature point pairs.

The compensation transform P(n) may be an affine transform. In mathematics, affine geometry is the study of geometric properties which remain unchanged by affine transformations, i.e. non-singular linear transformations and translations. A mathematical system of equations defined by numerical coefficients, called an Affine matrix, has been developed to characterize the lateral (up/down), rotational, and scalar (e.g., zoom in or zoom out) of movement detected between each pair of consecutive frames or between portions thereof (e.g., moving objects in the frames). Thus, the compensation transform P(n) for compensating camera jitter may be characterized as the first Affine transform matrix related to any actually-stationary objects (e.g., rocks, tables, parked cars, mountains, the sun) in the scene. In almost all cases the handshake and platform vibrations may result in translation, rotation and scaling of video frames. To model all these, a six parameter affine transform is required.

Even if the compensation transform P(n) is generated correctly to compensate for the unintended jittery motion, the resulting compensation frame may have a significant oscillating movement relative to the captured input video frames, and may extend beyond the image data available in some of the captured input video frames. This results in over-excursion of the compensation window.

To remove jerky motion in the video, the Compensation Unit crops out some boundary regions of each input video frame. The amount of removed boundary regions can be quantified as a cropping ratio. A large cropping ratio means more area at the boundaries is removed. An output video frame can be modeled as a compensation window superimposed over the input video frame. (see, e.g., FIG. 1) The compensation window can be rotated, shifted, scaled, etc. with respected to the input video frame.

For a given cropping ratio, the amount of movement of the compensation window is called compensation window excursion. Movement of the compensation window beyond the input video frame boundary is called compensation window over-excursion.

If there is no jitter (no unintended camera trajectory) then the compensation transform P(n) (based on feature points of actually-stationary objects) will be expected to be the same location in each of two or more consecutive frames (e.g., UNITY). If there is high frequency jitter, it is desirable to produce a spatially stabilized video having a reduced degree or reduced frequency of compensation window over-excursions.

A need therefore exists for a filtering method that adaptively balances between insufficient video stabilization and over-excursion.

SUMMARY

An aspect of the inventive concept provides a Digital Image Stabilization method including adaptively filtering a Principal/compensation transform P(n) representing a stationary/background object in the scene of a video frame, based on a history of compensation window over-excursions.

An aspect of the inventive concept provides a highly effective and predictable jitter removal method using a strong compensation (SC) filter. The SC filter is a highly frequency-selective high-order linear time-invariant digital filter. Effective filtering of very jerky input video using the SC filter implies significant movement of the compensation window through the captured input video frame. For a given cropping ratio, the amount of movement of the compensation window is called compensation window excursion. Movement of the compensation window beyond the captured input video frame boundary is called compensation window over-excursion. A strict application of the SC filter to a large-movement input video with will produce a very stable output video at the expanse of much compensation window over-excursion. On the other hand, a weak compensation (WC) filter having a lower frequency-selective characteristic will produce less compensation window over-excursions at the expanse of less stable output video.

An aspect of the inventive concept provides an adaptive compensation (AC) filter configured to prevent excessive over-excursion with large-movement input video while maintaining excellent video stabilization characteristics.

In an exemplary embodiment of the inventive concept, a caused linear time-variant filter, comprising a WC filter complements a SC filter, to product predictable characteristics. The combination WC/SC filter may be controlled based on the history of compensation window excursions over a plurality of K frames. Small excursions in the history permit a larger influence of the SC filter for the current frame n, whereas large excursions in the history warrants a larger influence of the WC filter for the current frame n. Medium excursions in the history assign proportional influences of the SC filter and the WC filter.

Another aspect of the invention provides a Digital Image Stabilization circuit adapted to perform the herein disclosed DIS methods. The circuit may be contained within a video camera itself, and activated to remove in real time the jitter prior to storage of the captured video frames (e.g., prior to or during MEPG encoding if the video camera includes a real-time MPEG encoder). Alternatively the DIS circuit employed to estimate camera trajectory between consecutive video frames and to filter out the jitter from a stored sequence of video frames may be a general purpose microcomputer controlled by software embodying a digital image stabilization (DIS) method, or may be a dedicated hardware, such as an MEPG video encoder embodied in an ASIC (application specific integrated circuit) optimized to perform a digital image stabilization (DIS) method.

Methods of computing the Principal/compensation P(n) transform from observed feature points in the scene are described in detail in co-pending and concurrently filed application Ser. No. 13/313,684, titled "DIGITAL IMAGE STABILIZATION DEVICE AND METHOD", and Ser. No. 13/313,715, titled "DIGITAL IMAGE STABILIZATION", the disclosures of these co-pending applications are incorporated by reference herein. A feature of exemplary embodiments of the inventive concept is the continuous storage of compensation window over-excursion history data which is for evaluating the computed Principal/compensation P(n) transform and to select a filtering strength to output a filtered Principal/compensation P'(n) optimized to reduce over-excursions. The method simultaneously measures vertical-up, vertical-down, horizontal-right, and horizontal-down over-excursions, and detects the peak among them for selecting the filtering coefficient E(n).

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the figures:

FIG. 1 is a block diagram of a Digital Image Stabilization (DIS) circuit performing a DIS method in accordance with an exemplary embodiment of the inventive concept;

FIG. 2 is a block diagram of a Detection Unit in the DIS circuit of FIG. 1 adapted to calculate the affine transforms of tile vector groups;

FIG. 3 is a block diagram of a Trajectory Unit (TU) of the DIS circuit of FIG. 1 adapted to select the principal (stationary/background) transform P(n) based on scoring tile group transforms and feature group transforms $T_i(n)$;

FIG. 4A is a block diagram of an exemplary implementation of a Group Transform Scoring And Selection Circuit configured to perform a step in the DIS method of the DIS circuit of FIG. 1;

FIG. 4B is a block diagram of an exemplary implementation of a History Score calculation Unit;

FIG. 5 is a block diagram of an exemplary implementation of Collective Transform Scoring and Selection Circuit;

FIG. 6 is a block diagram illustrating an exemplary embodiment of the Moving Object exclusion Circuit;

FIG. 7 is a flow chart illustrating process steps according to an embodiment of the present inventive concept.

FIG. 8 is a view of a captured video frame and a compensation window computed therein in a step of a Digital Image Stabilization (DIS) method in accordance with an exemplary embodiment of the inventive concept;

FIG. 9 is a block diagram of Digital Image Stabilization (DIS) modules performing a DIS;

FIG. 10 is a block diagram of an Adaptive Compensation Filter module method in accordance with an exemplary embodiment of the inventive concept; and FIG. 11 is a schematic block diagram of an Adaptive Compensation Filter module in accordance with an exemplary embodiment of the inventive concept.

DETAILED DESCRIPTION OF EXEMPLARY EMBODIMENTS

According to an embodiment of the present inventive concept, each captured video frame is divided into a small number of non-overlapping tiles (typically 4×4 tiles for Standard Definition and 6×6 tiles for High Definition), for the purpose of algorithmically selecting feature points providing a good feature point distribution suitable for digital image stabilization. Different regions of the image may have a different density of suitable feature points. In extreme cases, a region of the frame may not have any suitable feature points, for example in the case of a blue sky without any clouds. In other regions, the potential feature points might be very dense.

The obtained feature point distribution is based on small regions of the video frame, (e.g. non-overlapping tiles), where the number of feature points in each tile increases linearly with the variance $\sigma^2$ of the luminance image data of the tile. Tiles with more interesting image data and therefore the need for more feature points are expected to have a higher variance $\sigma^2$. See co-pending application No. 8729-357), describing a process that sets a minimum distance (MIN_DIST) between feature points in each tile while at the same time requiring only little local state information, thereby reducing the hardware implementation cost. The disclosure of 8729-357 is incorporated-by-reference herein.

If the scene was captured at low light conditions, it will have relatively more noise, and the noise effect is greater to the feature points than the tiles, because the number of pixels of feature points is much smaller than the number of pixels in the tile. The larger number of pixels in the tile provides the noise cancellation effect, and the downsampled tile-based motion vector is more accurate in this case.

Even if the scene is not captured in the low light condition, if the scene is too flat, the tile-based motion vector can be more accurate. If the tile scene is very flat like a cloudy sky or blue sky, there can be some feature points and these feature points in the flat tile can find similar levels of matching points at many places in the next frame. But, the tile-based matching does not rely only on a small feature-point search area, and all the patterns in the tile can contribute to the tile matching process. As a result, the tile-based motion vectors are more reliable when the scene is flat.

When the best score of feature point motion vector groups is smaller than a given threshold, we decide to use tile-based motion vectors instead of feature-point based motion vectors, and this strategy works well for the scenes of high noise or flat scenes.

According to an embodiment of the inventive concept, we choose the estimated motion vectors representing the movement of the background and large objects, whereas smaller objects do not need to have an accurate motion vector associated with them. Any inaccurate vectors for smaller objects can be filtered at a later stage of the DIS algorithm.

It is expected that feature points of the large stationary objects of significance will move in a coherent way because of global movement or camera movement. We recognize that sufficiently large objects that move independently cover the majority of at least one tile, so that their motion can be estimated as the predominate motion of the the itself, while the motion of small objects has little affect on the motion vector of the tile itself.

We derive one motion vector per tile, using block matching on the lowest resolution. The tile-based motion vectors can be used for the camera trajectory decisions in some special cases such as high noise or flat scene videos.

The motion vector for a given tile is the one that minimizes the sum of absolute differences (SAD). And, the process of calculating motion vectors of feature points in each tile may be modified to reduce computations, by using a hierarchical motion estimation algorithm and by preferring tile movement over local movement, using the motion vector of the tile as a start vector. Because a sufficiently large object that covers the majority of at least one tile may extend into adjacent tiles, it is probable that some feature points in each tile may be associated more strongly with the motion vector of an adjacent tile rather than the motion vector of the tile they are found within. Thus, it would be effective to use the motion vectors of all the adjacent tiles as multiple start vectors in the block matching search for the motion vector of the feature points of any given tile. Thus the start vectors used to obtain motion vectors of the selected feature points are those of the tile the feature point belongs to as well as those belonging to the four direct neighbors (Upper tile, Left tile, Right tile, Lower tile), provided it exists. For each start vector used, we only use a very small range for the local search for feature point motion vectors. The goal here is not so much to determine accurate vectors for each and every feature point (bad motion vectors will be sorted out later in the DIS processing chain). Rather, the feature points of interest are only those that belong to the background or large objects. For those feature points, one of the tile motion vectors should be good, or close to the motion vector of the feature points of interest, and therefore, a small local search about each selected tile motion vectors is sufficient. A small local block matching search is performed in a higher-resolution domain (this could be the original video resolution, or subsampled by a factor $f_{s3}$ of 2 or 4) around each of a set of start vectors for every selected feature point in the tile.

FIG. 1 is a block diagram of Digital Image Stabilization (DIS) circuit performing a DIS method in accordance with an exemplary embodiment of the inventive concept. The DIS circuit comprises an Detection Unit (DU) that analyses received jerky video and outputs inter-frame transforms Ti(n), a Trajectory Unit (TU) that outputs a selected Principal/compensation transform P(n) selected from among the inter-frame transforms Ti(n), and a Compensation Unit (CU) that outputs stabilized video by modifying the jerky video using the selected Principal/compensation transform P(n).

The Detection Unit (DU) estimates inter-frame motion vectors of feature points (FP) and inter-frame motion vectors of non-overlapping tiles (Tile vectors) in a received frame of video data. The Detection Unit further outputs FP motion vector group transforms and tile vector group transforms Ti(n).

The Trajectory Unit (TU) selects one of the inter-frame transforms Ti(n), (or Unity Transform in a case where a large moving object covers the scene) as the Principal Transform P(n), thus excluding the inter-frame transforms of small moving objects and of a large moving object that may move into and cover the entire frame.

FIG. 2 is a block diagram of the Detection Unit 2000 in the DIS circuit of FIG. 1 adapted to calculate the affine transforms of tile vector groups as steps of the DIS method of the DIS circuit of FIG. 1. The Detection Unit 2000 comprises a Feature Point Circuit 3000, an motion vector (MV) Grouping Circuit 1300, and a motion vector (MV) Group Affine Transform Calculator 2010.

The Feature Point Circuit 3000 receives each frame of video data and preferably divides each video frame into a small number j×k of non-overlapping tiles. The number j×k of tiles can range from 4×4 for SD video to 6×6 for HD video; other numbers in the range from (4 . . . 8)×(4 . . . 8) are also possible and may be beneficial. The tile size is chosen such that sufficiently large objects that move independently cover the majority of at least one tile, so that their motion can be captured for DIS purposes, while the motion of small objects may be ignored. Feature Point Circuit 3000 identifies and selects feature points (SFPs) in a received video frame, and outputs the motion vectors of feature points and of tiles (SFP MVs and Tile MVs).

The Feature Point Circuit 3000 comprises a Feature Point Selector and a Motion-Vector Calculator and a shared RAM Memory 350. The Feature Point Selector 300 may further comprise a Harris-Corner Feature Point Candidate Identifier, and a Feature Point Candidate Sorter. To save computational power and to reduce the number of required operations, the Feature Point Circuit 3000 operates only on luma data, and comprises one or more Downsamplers and a Hierarchical Block-Matching Search Unit.

The Feature Point Circuit 3000 estimates a motion vector for every tile. Tile motion vector (Tile MV) estimation is done on the basis of non-overlapping tiles that cover the center of the input image (e.g., the same tiles that may used in a feature point sorting algorithm). For each of the tiles, a full blockmatching search is performed on a deeply downsampled image. A full-search block matching is done for every tile and the tile motion vector (Tile MV) is stored (356) for later use, e.g., as a start vector in the Hierarchical Block-Matching Search Unit for deriving the motion vectors of the feature points (SFP MV stored at 352) and for stationary-object detection.

The Feature Point Circuit 3000 preferably provides a list of feature points 352 having a distribution based on small regions (tiles) of the video frame, called tiles, where the maximum number of feature points per tile increases linearly with the variance $\sigma^2$ of the luminance image data of the tile. Good feature points for the DIS method are points that yield non-ambiguous motion vectors when a suitable motion estimation algorithm is applied. To identify feature points in an image, a Harris Corner Detection algorithm is applied to pixels of a video frame to measure how well suited this pixel is as a feature point. Different regions (tiles) of the image may have a different density of identified feature point candidates.

The Feature Point Circuit 3000 preferably includes a Motion-Vector Calculator that performs the function of a Tile-Vector Calculator for calculating each tile's motion vector, and a Hierarchical Block-Matching Search Unit to determine and output the motion vector of each Selected Feature Point (SFP). The Tile-Vector Calculator calculates the motion vector of each tile using deeply downsampled luma data of the current frame $F_t$. Hierarchical Block-Matching Search Unit determines the motion vector of each of the selected feature points using the full-resolution or downsampled luma data of two consecutive frames, and may use the Tile Vectors as start vectors.

All feature-point and tile related data is passed to the next DIS block, particularly the motion vector grouping circuit 1300.

The Motion Vector Grouping Circuit 1300 is configured to perform the grouping algorithm on the FP motion vectors and on the tile motion vectors. The Feature Point Grouping Circuit 1300 comprises a Motion Vector Comparator 1310 configured to perform grouping decisions by comparing each pair of vectors selected by the Paring Algorithm Controller 1302.

The Feature Point Grouping Circuit 1300 groups FP motion vectors to associate the motion vectors of selected feature points (SFPs) with objects in the scene based on the object's perceived relative movement between consecutive video frames. The Feature Point Grouping Circuit 1300 also groups Tile motion vectors to associate the Tile vectors with objects in the scene based on the object's perceived relative movement between consecutive video frames.

The Feature Point Grouping Circuit 1300 shares the RAM Memory 350 with the Feature Point Circuit 3000. The SPF MV list portion 352-FP of the memory 350 contains the list of locations and motion vectors of selected feature points (SFPs). The Tile MV list portion 352-TMV of the memory 350 contains the list of locations and motion vectors of the non-overlapping tiles.

The Paring Algorithm Controller 1302 keeps track of which feature points and tiles (motion vectors) have been already paired with which others, which remain unpaired, and which will be entirely excluded from grouping. The paring algorithm repeatedly provides pairs of motion vectors (vector A & vector B) as inputs to the MV Comparator 1310.

The Paring Algorithm Controller 1302 in the Feature Point Grouping Circuit 1300 accesses the SPF MV list (352-MV) and the Tile MV list (352-TMV) and selects vectors A and vectors B for comparison in the Motion Vector Comparator 1310. When series of vectorA-vectorB comparison results in one or more groups of vectors (e.g., groups of selected feature points and groups of tiles), the Paring Algorithm Controller 1302 writes the grouped motion vectors or a descriptive list thereof into the FP MV Group Inventories portion 354 and Tile MV Group Inventories portion 358 of the memory 350.

The motion vector (MV) Group Affine Transform Calculator 2010 calculates the inter-frame transform of each group of feature point motion vectors, and calculates the inter-frame transform of each group of tile motion vectors and outputs them all as Ti(n).

FIG. 3 is a block diagram of the Trajectory Unit (TU) 4000 of the DIS circuit of FIG. 1 adapted to select the principal (stationary/background) transform P(n) based on a method of scoring tile group transforms and feature group transforms $T_i(n)$, in accordance with steps of the DIS method of the DIS circuit of FIG. 1.

The Trajectory Unit (TU) 4000 (FIG. 3) comprises a Tile Group Transform Scoring and Selection Circuit 4100-1 (FIG. 4A), a Feature Group Transform Scoring and Selection Circuit 4100-2 (FIG. 4A), a Collective Group Selection Circuit 4200 (FIG. 5), a Moving Object Exclusion Circuit 4400 (FIG. 6), and an Adaptive Compensation Filter.

The Trajectory Unit (TU) 4000 identifies the principle motion P(n) caused by unsteady camera while ignoring moving objects in the scene, filters the selected Principal Transform P(n), and outputs the Compensation Transform C(n). The Trajectory Unit (TU) 4000 employs a plurality of continuous scoring functions to select the Principle Transform P(n) from among the received inter-frame transforms Ti(n).

FIG. 4A is a block diagram of the Group Transform Scoring and Selection Circuit 4100 of the Trajectory Unit (TU) 4000 of the DIS circuit of FIG. 1, comprising a Transform Score Calculator 4150, Transform Quality Calculator 4160, and a Group Transform and Quality Selector 4170 configured to perform a step in the DIS method of the DIS circuit of FIG. 1. The Group Transform Scoring and Selection Circuit 4100 is adapted to output the Tile Group Principle Transform $GP_{Tile}(n)$ from Tile Group Inter-frame Transforms $T_{Tile,i}(n)$ (4100-1), and adapted to output the Feature Group Principle Transform $GP_{FP}(n)$ from FP Inter-frame Transforms $T_{FP,i}(n)$ (4100-2).

FIG. 4B is a block diagram of an exemplary implementation of the History Score calculation Unit 4110-1 in the Group Transform Scoring And Selection Circuit 4100 of FIG. 4A shown in the implementation 4100-1 thereof of FIG. 4.

Referring to FIGS. 4A and 4B, the Group Transform Scoring And Selection Circuit 4100 comprises a History Score Calculation Unit 4110 (e.g., 4110-1), a Motion Score Calculation Unit 4120, a Feature Score Calculation Unit 4130, and an Extent Score Calculation Unit 4140, plus a total Transform Score $S_i(n)$ Calculator 4150, a Transform Quality $Q_i(n)$ Calculator 4160, and a Group Transform and Quality Selector 4170 (e.g., 4170-1).

The Group Transform and Quality Selector 4170 of the Group Transform Scoring and Selection Circuit 4100 of FIG. 4A selects one of the inter-frame transforms Ti(n) as the Group Principle Transform GP(n) (by rejecting the inter-frame transforms of small moving objects) based on the total Transform Score $S_i(n)$ (of each inter-frame transform $T_i(n)$) received from the total Transform Score Calculator 4150, and outputs the Group Principle Transform GP(n) and its associated Quality Q(n).

Let $T_i(n)$ be the $i^{th}$ transform out of all received Transform candidates received from the Detection Unit (DU) 2000, where n denotes a frame and the time sequence nature. Let GP(n) be the selected Group Principle Transform at frame time n, i.e., GP(n)=Ti(n) for a selected i.

For each $T_i(n)$, the total Transform Score $S_i(n)$ Calculator 4150 receives a History score $H_i(n)$ from the History Score calculation Unit 4110 (e.g., 4110-1), receives a Motion score $M_i(n)$ from the Motion Score calculation Unit 4120, receives a Feature score $F_i(n)$ from the Feature Score calculation Unit 4130, and receives an. Extent score $E_i(n)$ from the Extent Score calculation Unit 4140, and calculates the total Transform Score $S_i(n)$ based on the following equation:

$$S_i(n)=H_i(n)*M_i(n)*F_i(n)*E_i(n)$$

For each $T_i(n)$, the Transform Quality $Q_i(n)$ Calculator 4160 receives a Feature score $F_i(n)$ from the Feature Score calculation Unit 4130, and receives an Extent score $E_i(n)$ from the Extent Score calculation Unit 4140, and calculates the Transform Quality $Q_i(n)$ based on the following equation:

$$Q_i(n)=F_i(n)*E_i(n).$$

The $T_i(n)$ having the largest value $S_i(n)$ shall be selected as the Group Principle Transform GP(n) by the Group Transform Selector 4170 of the Group Transform Scoring And Selection Circuit 4100 of FIG. 4A. Thus, in this exemplary embodiment, the inter-frame transform candidate $T_i(n)$ with the highest score $S_i(n)$ is selected as the Group Principle Transform. GP(n) and then adaptively filtered to produce the Compensation Transform C(n) to compensate for jittery camera motion, in the DIS Compensation Unit (CU) 6000 of the DIS circuit of FIG. 1.

The History Score calculation Unit 4110 (e.g., 4110-1) stores the History of the Group Principle Transform GP(n) and calculates a History score $H_i(n)$ for each $T_i(n)$, e.g., seriatim when each $T_i(n)$ is received from the Detection Unit (DU) 2000, based on a predetermined length HL of the stored History of the Group Principle Transform GP(n), wherein HL is a integer indicating a predetermined number of prior frames. The incoming $T_i(n)$ is mathematically compared with each of the HL stored previously-selected Group Principle Transforms GP(n−1) GP(n−k), wherein k is the integral frame-time index that ranges from one (denoting the immediately previous frame: n−1) to HK (the more timewise distant frame: n−HK). Transforms among $T_i(n)$ having a higher correlation with the HL stored previously-selected Group Principle Transforms GP(n−1) through GP(n−HL) have a higher History score $H_i(n)$.

The correlation Hi,k(n) between Ti(n) and each GP(n−k) is unity minus the normalized norm (1−|Ti(n)−GP(n−k)|) in the range [0,1] wherein a value of Hi,k(n)=1 indicates the highest correlation.

The contribution of each correlation Hi,k(n) (1−|Ti(n)−GP(n−k)|) is weighed by corresponding History-Weights HW(k).

The History score $H_i(n)$ is the total correlation and is the HW(n−k) weighted sum of Hi,k(n), for 1<k<HL, where HL is the length (number of past frames) of the history. Thus, $$H_i(n)=\Sigma[1-|T_i(n)-GP(n-k)|*HW(k)],$$

for 1<k<HL.

The weights HW(n−HL) through HW(n−1) are preferably selected so that their sum equals one and so that the History score $H_i(n)$ output is non-linearly normalized and has a continuous range [0,1].

The exemplary hardware implementation 4110-1 of History Score calculation Unit 4110, shown in FIG. 4B includes a FIFO (first-in-first-out) memory buffer for storing HL previous-selected Group Principle Transforms GP(n−1) through GP(n−HL) having HL taps (for n−1 through n−HL) for outputting their stored contents into a comparator 4114. The comparator 4114 compares the current $T_i(n)$ with each of the HL stored previous-selected Group Principle Transforms GP(n−1) through GP(n−HL), and outputs each comparison weighted by history weights HW(n−1) through HW(n−HL) to the total History Score calculator 4116 which outputs the total correlation as total History score $H_i(n)$ in the continuous range [0,1].

The Motion Score calculation Unit 4120 receives each $T_i(n)$ and calculates its Motion score $M_i(n)$ based only on $T_i(n)$. In alternative embodiments, the Motion Score calculation Unit 4120 can be configured to receive stored information from the Detection Unit 2000 for the purpose of calculating the Motion score $M_i(n)$. Transforms with small motion have a higher Motion score $M_i(n)$ and are more likely to be the Group Principle Transform GP(n). For each inter-frame transform among $T_i(n)$, the Motion Score calculation Unit 4120 calculates Motion score $M_i(n)$.

A Mi(n) having a large value corresponds to small motion, and vice versa. Motion $M_i(n)$ may be based on the horizontal, vertical, or total linear displacement of the transform. The Motion score Mi(n) is inversely related to the linear displacement, and is preferably non-linearly normalized to have a continuous range [0,1].

The Feature Score calculation Unit 4130 receives each $T_i(n)$ and calculates its Feature score $F_i(n)$ based only on $T_i(n)$. In alternative embodiments, the Feature Score calculation Unit 4130 can be configured to receive stored information from the Detection Unit 2000 for the purpose of calculating the Feature score $F_i(n)$. For each inter-frame transform among $T_i(n)$, the Feature Score calculation Unit 4130 calculates Feature score $F_i(n)$. Feature score $F_i(n)$ correlates with the number of feature points grouped together to make up the feature point group represented by each inter-frame transform among $T_i(n)$. Transforms among $T_i(n)$ having more feature points per group have a higher Feature score $F_i(n)$. Feature score Fi(n) is preferably non-linearly normalized having a continuous range [0,1].

The Extent Score calculation Unit 4140 receives each $T_i(n)$ and calculates its Extent score $E_i(n)$ based only on $T_i(n)$. In alternative embodiments, the Extent Score calculation Unit 4140 can be configured to receive stored information from the Detection Unit 2000 for the purpose of calculating the Extent score $E_i(n)$. For each inter-frame transform among $T_i(n)$, the Extent Score calculation Unit 4140 calculates Extent score $E_i(n)$. Transforms among $T_i(n)$ having feature points covering (spread over) larger area are scored higher. Extent score $E_i(n)$ having a larger value corresponds to a larger covered area, and vice versa. Extent score Ei(n) correlates to the height times width of the rectangular area containing all feature points of the group of the transform. The Extent score $E_i(n)$ is preferably non-linearly normalized to have a continuous range [0,1].

Various exemplary embodiments of the inventive concept uses scene history analysis to exclude large objects moving across the entire scene that would otherwise cause undesirable results in video stabilization. Without proper scene history analysis, a principle transform selector is most likely to select the transform candidate corresponding to the large moving object, especially when it covers the entire scene. We recognize that when a large object moves across and fills the entire scene, the transform candidates Ti(n) do not include a Principle Transform P(n) that corresponds to the unsteady camera.

FIG. 5 is a block diagram of an exemplary implementation of the Collective Transform Scoring and Selection Circuit 4200 of the Trajectory Unit (TU) 4000 of the DIS circuit of FIG. 1, comprising a Collective Decision Calculator 4250 configured to calculate a Collective Decision CD(n), and a Collective Transform Selector 4260 configured to output a Collective Principle Transform CP(n) as steps in the DIS method of the DIS circuit of FIG. 1.

The Collective Decision Calculator 4250 in FIG. 5 calculates a Collective Decision CD(n) from the Feature Group Transform Quality $Q_{FP}(n)$, the Tile Group Transform Quality $Q_{Tile}(n)$, and the number of feature group transform candidates $K_{FG}(n)$ received from the Detection Unit (DU) 2000.

An exemplary implementation of the Collective Decision Calculator 4250 includes calculating a non-linearly normalized Fragmentation Measure $\Theta_F(n)$ from the number of feature groups $K_{FG}(n)$, such that $\Theta_F(n)$ is 0 when $K_{FG}(n)$ is small, and $\Theta_F(n)$ is 1 when $K_{FG}(n)$ is large. Thus, a $\Theta_F(n)$ value close to 1 indicates that all the feature points in the video scene are fragmented to many feature groups, and vice versa.

The Collective Decision Calculator 4250 outputs a Collective Decision CD(n) by comparing $Q_F(n)$ and $\Theta_F(n)*Q_T(n)$, and if $Q_F(n) > \Theta_F(n)*Q_T(n)$, then the Collective Decision CD(n) is set to select Feature Group. And, if $Q_F(n) <= \Theta_F(n) *Q_T(n)$, then the Collective Decision CD(n) is set to select Tile Group. In this formulation, if the feature groups are not fragmented, then $\Theta_F(n)$ is close to 0, and the Feature Group is more likely to be selected. Otherwise, if the feature groups are fragmented, then $\Theta_F(n)$ is close to 1, and the Tile Group Transform Quality $Q_{Tile}(n)$ is compared on equal grounds with the Feature Group Transform Quality $Q_{FP}(n)$.

The Collective Transform Selector 4260 performs selection between the Feature Group Principle Transform $GP_{FP}(n)$ and the Tile Group Principle Transform $GP_{Tile}(n)$. The Collective Transform Selector 4260 is controlled by the Collective Decision CD(n) such that the output Collective Principle Transform CP(n) is set to Feature Group Principle Transform $GP_{FP}(n)$ when CD(n) is set to Feature Group, and to Tile Group Principle Transform $GP_{Tile}(n)$ otherwise.

In this embodiment, the Collective Transform Scoring and Selection Circuit 4200 performs selections based on Feature Group Transform Quality $Q_{FP}(n)$ and Tile Group Transform Quality $Q_{Tile}(n)$. These group transform qualities are calculated by the transform Quality calculator 4160 of FIG. 4A, which receives inputs from the Feature Score calculation Unit 4130 and the Extent Score calculation Unit 4140.

The Feature Score calculation Unit 4130 calculates its Feature score $F_i(n)$ of feature-based and tile-based transforms $T_i(n)$. In this embodiment, the Feature Score calculation Unit 4130 is configured to receive stored information from the Detection Unit 2000 for the purpose of calculating the Feature score $F_i(n)$. For each inter-frame transform among $T_i(n)$, the Feature Score calculation Unit 4130 calculates Feature score $F_i(n)$. Transforms $T_i(n)$ with more feature points in a group or more tiles in a group will have a higher Feature Score $F_i(n)$, and results in higher Feature Group Transform Quality $Q_{FP}(n)$ or Tile Group Transform Quality $Q_{Tile}(n)$, respectively. In some embodiments, the number of feature points per tile may govern the score Feature score $F_i(n)$ of feature-based transforms $T_i(n)$. In other embodiments, the number of tiles may govern the score Feature score $F_i(n)$ of tile-based transforms $T_i(n)$. The number of feature points per tile, and/or the number of tiles in each group of tile vectors can be obtained directly from the Detection Unit 2000.

The Extent Score calculation Unit 4140 calculates the Extent score $E_i(n)$ of feature-based and tile-based transforms $T_i(n)$. In this embodiment, the Feature Score calculation Unit 4130 is configured to receive stored information from the Detection Unit 2000 for the purpose of calculating the Feature score $F_i(n)$. Transforms with feature points or tiles covering larger area are scored higher. The number of feature number and dimensions of the tiles in each group of tile vectors can be obtained directly from the Detection Unit 2000. Similarly, the horizontal and vertical extent of each group of feature-based motion vectors can be obtained directly from the Detection Unit 2000. Feature groups covering a larger area or tile group covering a larger area will have a higher Extent Score $E_i(n)$, and results in higher Feature Group Transform Quality $Q_{FP}(n)$ or Tile Group Transform Quality 0 respectively. In this embodiment, the Extent Score calculation Unit 4140 is configured to receive stored extent information from the Detection Unit 2000 for the purpose of calculating the Extent score $E_i(n)$.

After the Collective Principle Transform CP(n) has been selected by the Collective Transform Scoring and Selection Circuit 4200, the Large Object Exclusion Hardware decides whether the selected Collective Principle Transform CP(n) is or is not a large moving object moving into and covering the entire scene. When such exclusion is in effect, a Unity Transform (UT) is created to substitute and serve as the selected Principle Transform P(n) for the compensation circuit of the DIS system, so that the stabilized video will not incorrectly or unnecessarily follow the transform of the large moving object.

According to one embodiment of the present inventive concept, the moving object exclusion method is activated based on two observations: a pre-existed stationary background (indicated by the history of P(n)); and a time-period of co-existence of the stationary background and the large moving object.

The moving object exclusion method can be highly effective in dealing with the following scenario: The scene has a mostly stationary background with or without moving objects; A large moving object enters the scene, and progressively covers larger area; The large moving object covers the entire scene; The large moving object starts leaving the scene, and the background starts to reappear; The large moving object eventually moved away.

The moving object analyzer detects the exclusion scenario IF:

consecutive stationary MV Group existence indicates an existed scene with mostly stationary background;

increasing count of consecutive similar-speed MV Groups indicates an object is moving into the scene;

the trend continues, and at time n the consecutive similar-speed MV Groups cover the entire scene and the stationary MV Group ceased to exist, then the exclusion scenario is detected The Exclusion Decision ED(n) is sent to the Exclusion Transform Selector. The Exclusion Transform Selector selects the Collective Principle Transform CP(n) unless ED(n) indicates the exclusion scenario, in which event then the Principle Transform P(n) is set to Unity Transform. Thus, the stabilized video will not incorrectly follow a large moving object even when it covers the entire scene.

FIG. 6 is a block diagram of an exemplary implementation of the Moving Object Exclusion Circuit 4400 of the Trajectory Unit (TU) 4000 of the DIS circuit of FIG. 1, comprising a Moving Object Analyzer 4470 and an Exclusion Transform Selector 4480 configured to perform a step in the DIS method of the DIS circuit of FIG. 1.

The Moving Object Exclusion Circuit 4400 comprises a plurality of Group History circuits 4410, 4420, 4430, 4440 for storing a scene's history, and a Moving Object Analyzer 4470. At any time, there is only one designated stationary group $G_0$, but there can be zero or more existing motion groups $G_k$, where k>0. There may also be a new motion group GN, which will during the next frame become one of the k (e.g., k(n+1)=k(n)+1) existing motion groups $G_k$.

The stationary group $G_0$ has an associated group history $GH_0$. Each of the k existing motion groups $G_k$ has an associated group history $GH_k$, as well as an associated motion vector $M_k$. Each existing motion group $G_K$ has a Motion Vector $M_K$, which is basically low-pass filtered $|T_i(n)|$ for each similar-speed $T_i(n)$ over time up to frame n.

Each new motion group $G_N$ has an associated group history $GH_N(n)$ which is initialized at the time of its creation. The Moving Object Analyzer 4470 receives the scene history comprised of the plurality of Group Histories $GH_0(n)$, $GH_1(n)$, ... $GH_j(n)$, and $GH_K(n)$ and $GH_N(n)$, and from them computes an Exclusion Decision $ED(n)$.

The Exclusion Transform Selector 4480 performs selection between the Unity Transform (UT) and the Collective Principle Transform $CP(n)$. The Exclusion Transform Selector 4480 is controlled by the Exclusion Decision $ED(n)$ such that the output Principle Transform $P(n)$ is set to Unity Transform (UT) when $ED(n)$ is activated, and to the Collective Principle Transform $CP(n)$ otherwise. A Unity Transform (UT) will cause the Compensation Unit to do nothing during compensation. Thus, when the Moving Object Analyzer 4470 detects the "large moving object" scenario and activates the Exclusion Decision $ED(n)$, the large moving object's transform which might otherwise be selected as the Principal transform $P(n)$ is excluded from being the selected Principle transform $P(n)$. In effect, the transform of a large moving object, when detected, is excluded from the compensation performed by the Compensation Unit 6000.

FIG. 7 is a hybrid block diagram—flow chart illustrating details of the Moving Object Exclusion Circuit 4400 of FIG. 6, configured to perform steps in the DIS method of the DIS circuit of FIG. 1. FIG. 7 illustrates details of representative Group History circuits 4410, 4430, and 4440 corresponding to the stationary Group $G_0$, existing motion group $G_K$, and newly created motion group $G_{N+1}$ respectively.

Each of the Group Histories (e.g., $H_0(n)$) received from Group History circuits (e.g., 4410) by the Moving Object Analyzer 4470 of the Moving Object Exclusion Circuit 4400 of FIG. 6 includes two species of history data, Selection-History (e.g., $SH_0(n)$) and Existence-History (e.g., $EH_0(n)$) corresponding to each group.

Moving Object Analyzer 4470 detects the exclusion scenario as follows: Consecutive existence and selections indicated in group history GH0 of the stationary transform $G0(n)$ indicates that a scene with mostly stationary background has existed for a number of frames; A progressively increasing number of consecutive existences in the group history $GH_K$ of a particular motion group $G_K$ indicates that an object is moving into the scene; If this trend of existences and motion continues, and if at time (n) no stationary transform joins G0 but the selected transform $P(n)$ joins $G_K$, then the large moving object scenario is detected, and the activited Exclusion Decision $ED(n)$ is sent to the Principle Transform Selector 4160-2. If $ED(n)$ indicates the large object exclusion scenario, then the Principle transform $P(n)$ is set to Unity Transform, otherwise, the Principal transform $P(n)$ is selected according to some scoring function of $Ti(n)$.

Each of the Group History circuits 4410, 4420, 4430, 4440 performs storage and processing of three species of history information for each group associated with one of the received inter-frame Transforms $T_i(n)$. The three species of group history are Selection-History, and Existence-History, and Motion-History. The stationary group $G_0$ is created with an empty history at video stabilization startup. The Motion History of the stationary group $G_0$ may be omitted, and presumed null. The motion groups ($G_1, \ldots, G_K, \ldots, G_N$) are created or deleted dynamically during the course of DIS video processing.

Referring to FIG. 7 Group History circuits 4410, 4430, and 4440 corresponding to the stationary Group $G_0$, N existing motion group $G_K$, and newly created motion group $G_{N+1}$ respectively, provide group histories $GH_0$, $GH_K$ and $GH_{N+1}$.

Group History circuit 4410 of the motion group $G_0$ includes a History$_0$ memory for storage of Selection-History $SH_0$, and Existence-History $EH_0$. Existence-History $EH_0$, is a one-bit per past frame value that indicates whether or not an Inter-frame Transform $T_i(n)$ has joined the motion group $G_0$ in the previous frames. Selection-History $SH_0$ is a one-bit per past frame value that indicates whether or not the Inter-frame Transform $T_i(n)$ that joined the motion group $G_0$ was selected as the Principal transform $P(n)$ in the previous frames.

The Group History circuit 4410 of the stationary group $G_0$ omits Motion-History $M_0$ because a decision (decision step dS4418) whether any $T_i(n)$ including the selected Principal transform $P(n)$ joins the stationary group $G_0$ depends upon comparing $T_i(n)$ with a threshold value $thd_0$ rather than with a variable history-based Motion vector $M_0$, because group $G_0$ is deemed stationary. The stationary group $G_0$ is created with an empty history at video stabilization startup.

If during frame n a $T_i(n)$ satisfies $|T_i(n)|<thd_0$, (YES branch of decision step dS4418), then:

This $Ti(n)$ joins $G_0$;

Existence-History $EH_0$ is updated to indicate the existence of a stationary transform at frame n; and, if $P(n)$=this $T_i(n)$, then Selection-History $SH_0$ is updated to indicate the selection of this $T_i(n,)$.

Otherwise, (NO branch of decision step dS4418) during frame those $T_i(n)$ which do not satisfy $|T_i(n)|<thd_0$, are compared with Group History in each of the existing motion groups $G_1$ to $G_N$.

Group History circuit 4430 of the motion group $G_K$ includes a History$_K$ memory for storage of Selection-History $SH_K$, and Existence-History $EH_K$, and Motion-History $M_K$. Existence-History $EH_K$, is a one-bit per past frame value that indicates whether or not an Inter-frame Transform $T_i(n)$ has joined the motion group $G_K$ in the previous frames. Selection-History $SH_K$ is a one-bit per past frame value that indicates whether or not the Inter-frame Transform $T_i(n)$ that joined the motion group $G_K$ was selected as the Principal transform $P(n)$ in the previous frames.

Motion-History $M_K$ stores information indicating the vector $M_K$ of the overall motion of the group $G_K$. Each $T_i(n)$ also maps to a motion vector M. Each motion group $G_K$ maps to a motion vector $M_K$. Let $|T_i(n)|$ be the size of the motion vector of $T_i(n)$, and $|T_i(n)-M_K|$ the deviation of $T_i$n) from the motion vector $M_K$ of the existing motion group $G_K$ for $1<K<N$, where N is the number of currently existing motion groups. A motion group $G_J$ among the N existing motion groups having the minimum $|T_i(n)-M_J|$ indicates a best matching group $G_J$ for $T_i(n)$. This joining decision may be determined by comparing $|T_i(n)-M_J|$ with a predetermined threshold value $thd_1$. Thus, for example, in decision step dS4438, if $|T_i(n)-M_J|\leq|T_i(n)-M_K|$ for a particular J and all K between 1 and N, and $|T_i(n)-M_J|<thd_1$, (YES branch of decision step dS4438) then this $T_i(n)$ joins the existing motion group $G_J$.

If $|T_i(n)-M_J|\leq|T_i(n)-M_K|$ for all K and $|T_i(n)-M_J|<thd_1$, (YES branch of decision step dS4438) then:

$T_i(n)$ joins $G_J$;

Motion-History $M_J$ is adjusted to reflect the newly joined $T_i(n)$;

Existence-History $EH_J$ is updated to indicate the existence of the motion group $G_J$ at frame n;

if $P(n)$=this $T_i(n)$, then Selection-History $SH_J$ is updated to indicate the selection of this $T_i(n,)=P(n)$.

On the other hand, if after decision step dS4438 has been repeated for a $T_i(n)$ and for all existing motion groups ($G_1$ through $G_N$) and none of the $M_K$ satisfies $|T_i(n)-M_K|<thd_1$, (NO branch of decision step d54438) then this $Ti(n)$ joins newly created motion group $G_{N+1}$ (step S4449). If this Ti(n) joins newly created motion group $G_{N+1}$ (step S4449), then:

Ti(n) joins the newly created motion group $G_{N+1}$;

Motion-History $M_{N+1}$ is set to the motion vector of this Ti(n);

Existence-History $EH_{N+1}$ is initialized to indicate the existence of the new motion group $G_{N+1}$ at frame n; and if P(n)=this $T_i(n)$, then Selection-History $SH_{N+1}$ is updated to indicate the selection of this $T_i(n,)$=P(n).

Any motion group (among $G_0$ through $G_J$) without any $T_i(n)$ joining for an extended period of time (frames) will be deleted.

FIG. 8 is a view of a captured video frame captured at time n and a compensation window corresponding to a Compensation Transform C(n) computed from the Principle Transform P(n), illustrating a vertical over-excursion v1 to be reduced. The vertical over-excursion of the compensation window is measured as v1 in a step of a Digital Image Stabilization (DIS) method in accordance with an exemplary embodiment of the inventive concept.

As shown in FIG. 8, the compensation window corresponding to a Compensation Transform C(n) of the captured video frame can have a vertical over-excursion (v0 or v1), a horizontal over-excursion (u0 or u1) or both vertical and horizontal over-excursions (v0 or v1) and (u0 or u1). Each of the potential over-excursions (v0 v1, u0, and u1) may be caused by a translational component of the Compensation Transform C(n), by a rotation component of the Compensation Transform C(n), or by a combination of translational and rotational components of the Compensation Transform C(n).

It is desirable to minimize the over-excursions (of v0, v1, u0, and u1) by adaptively filtering the Principle Transform P(n) to output a filtered Compensation Transform C(n) for each captured video frame based on the history of excursions.

FIG. 9 is a block diagram of Digital Image Stabilization (DIS) circuit performing a DIS method in accordance with another exemplary embodiment of the inventive concept. The DIS circuit comprises a Detection Unit (DU) 2000 that analyses received jerky video and outputs Inter-frame Transforms $T_i(n)$, a Trajectory Unit (TU) 4000 comprising Principle Transform Selection Circuits (4100, 4200, 4400) that identifies a Principal transform P(n) among $T_i(n)$ and an Adaptive Compensation Filter 8000 that filters P(n) to a Compensation Transform C(n), and a Compensation Unit (CU) 6000 that outputs stabilized video by modifying the jerky video frames using C(n).

The Principle Transform Selection Circuits (4100, 4200, 4400) selects one of the Inter-frame Transforms Ti(n) as the Principal Transform P(n) by identifying the Inter-frame Transform $T_i(n)$ of the global motion caused by unsteady camera while ignoring the Inter-frame Transforms $T_i(n)$ of moving objects in the scene, and outputs its selection as the calculated Principal Transform P(n). Thus the Principle Transform Selection Circuits (4100, 4200, 4400) of the DIS circuit selects and outputs one of the inter-frame transforms $T_i(n)$ as the calculated Principal Transform P(n). The Compensation Transform C(n) is obtained by adaptively filtering the Principle Transform P(n). The Compensation Transform C(n) is a description of the geometry of a stabilized video image (compensation window) in relation to the corresponding input video image. The description can contain position, angle, scale, etc. Some commonly used compensation transforms are the similarity transform and the affine transform, and while inventive concept is not restricted to these transforms, we will use the affine transform for illustration of exemplary methods according to the present inventive concept.

The Principle Transform Selection Circuits (4100, 4200, 4400) sequentially outputs the selected Principal Transforms P(n−∞), ..., P(n−1), P(n) of a continuous sequence of frames to the Adaptive Compensation Filter 8000, where the Principal Transform P(n−∞) indicates the use of recursive (Infinite impulse response IIR) filters. The Adaptive Compensation Filter 8000 estimates the intended camera trajectory from the jittery motions represented by the sequence of Principle Transforms P(n−∞), ..., P(n−1), P(n), and outputs the Compensation Transform C(n) according to the estimated camera trajectory.

The visual effect of the stabilized video is highly dependent on the quality of the Adaptive Compensation Filter 8000. Conventional trajectory estimation methods include Motion Vector integration and Kalman Filter, etc. However, these and other conventional trajectory estimation methods do not perform well in a wide range of jerky video characteristics. In exemplary embodiments of the inventive concept, an adaptive compensation filter is used to filter out the jerky motions, and produces stabilized video.

FIG. 10 is a block diagram of the Adaptive Compensation Filter 8000 in the Trajectory Unit (TU) 4000 of the DIS circuit of FIG. 9 configured to adaptively filter the Principle Transform P(n) based on the history of compensation window excursions. The Adaptive Compensation Filter 8000 filters the Principle Transform P(n) and outputs the adaptively filtered Compensation Transform C(n) based on the received Principal Transforms P(n−∞), ..., P(n−1), P(n) of a continuous sequence of frames.

The Adaptive Compensation Filter 8000 includes a Strong Compensation Filter (SC) 8700, a Weak Compensation Filter (WC) 8600, an Adaptive Filter control circuit 8500 for outputting a control signal E(n), and an Excursion Modulated Mixer 8200. The SC filter is a highly frequency-selective high-order linear time-invariant digital filter, effective for filtering of very jerky input video. On the other hand, the weak compensation (WC) filter has lower frequency-selective characteristic that will produce less compensation window over-excursions at the expense of less stable output video.

The Adaptive Compensation Filter 8000 is effectively a combination of the SC filter and the WC filter. The Excursion Modulated Mixer 8200 performs the mixing of the SC filter and the WC filter outputs based on the control signal E(n) generated and output by the Adaptive Filter Controller 8500 based on the history of compensation window excursions.

FIG. 11 is a block diagram of a first exemplary implementation 8000-1 of the Adaptive Compensation Filter 8000 of the Trajectory Unit (TU) 4000 of the DIS circuit of FIG. 9. The exemplary Adaptive Compensation Filter 8000-1 comprises a Strong Compensation Filter 8700 and a Weak Compensation Filter 8600, and a feedback loop into the Excursion Calculator 8510 of the Adaptive Filter Controller 8500-1.

Referring to FIG. 11 the Strong Compensation Filter (SC) 8700 is a high-order linear time-invariant recursive digital filter having a cutoff frequency at about 1.0 Hz and a sharp rolloff to attain visually good stabilized video and has a highly frequency-selective output F(n).

The Weak Compensation Filter (WC) 8600 is a high-order or lower-order linear time-invariant recursive digital filter. The WC 8600 has a lower frequency-selective output G(n) with a cutoff frequency slightly higher than 1 Hz (e.g., at 1.2 Hz) and a soft rolloff to reduce over-excursions.

The Excursion Modulated Mixer 8200-1 of the Adaptive Compensation Filter 8000-1 performs an excursion modulated adaptive filtering that combines F(n) and G(n) according to the scalar control signal E(n). The output of the SC filter F(n) and the output of the WC filter G(n) are both intermediate compensation transforms, and the output of the Excursion Modulated Mixer 8200-1 C(n) is also a compensation transform. The Excursion Modulated Mixer 8200-1 outputs C(n) =(1−E(n))*F(n)+E(n)*G(n), wherein E(n) is a non-linearly normalized scalar control signal in the range [0,1], "*" is a multiply operation between a scalar and a transform, mapping on to a transform, and "+" is an addition operation between two transforms, mapping on to a transform. Thus the Adaptive Compensation Filter 8000-1 in this exemplary embodiment is a linear combination of the SC filter and the WC filter. Thus, the Adaptive Compensation Filter 8000-1 is effectively a high-order linear time-variant recursive digital filter that possesses known stable characteristic by the principle of linear superposition.

The linear combined Compensation Transform C(n) is controlled by scalar control signal E(n) based on the history of compensation window excursions. Small excursions in the history produce a small E(n) and thus increase the influence of the SC filter for the current frame n, whereas large excursions in the history produce a E(n) close to 1 and thus increase the influence of the WC filter for the current frame n. Medium excursions in the store history assign proportional influences of the SC filter and the WC filter.

Thus, the SC filter provides the main contribution at small excursions, and it is very effective at filtering out high frequency jitters. And since the WC filter contributes more at larger excursions, the occurrence of over-excursion is greatly reduced. The Adaptive Compensation Filter 8000-1 prevents excessive over-excursion with large-movement input video while maintaining excellent video stabilization characteristics.

Referring to FIG. 11, the Adaptive Filter Controller 8500-1 comprises an Excursion Calculator 8510, four Excursion History Integrators 8520, and a Modulation Factor Calculator 8530-1. The Adaptive Filter Controller 8500-1 is part of a feedback loop. The Excursion Calculator 8510 output E(n) is derived from previous Adaptive Compensation Filter outputs C(n−∞), . . . , C(n−2), C(n−1) where n denotes its time sequence nature, so that E(n) and C(n) do not form a non-realizable delay-free loop. Thus, the exemplary embodiment is suitable for real time video stabilization, and includes a causal linear time-variant filter with predictable characteristics.

The Excursion Calculator 8510 receives a feedback of Compensation Transform C(n) output by the Excursion Modulated Mixer 8200-1. The Excursion Calculator 8510 comprises a u0 calculator, a u1 calculator, a v0 calculator, and a v1 calculator, to separately calculate left, right, bottom, and top side excursions per frame, based on the position of the four corners of the compensation window (see FIG. 8).

The Adaptive Compensation Filter 8500-1 retains excursion history through the use of recursive filters. The output of each side excursion calculator of Excursion Calculator 8510 is then individually time-integrated by the Excursion History Integrator, which is essentially a low-pass recursive filter. The output of each low-pass recursive filter (Hu0, Hu1, Hv0, Hv1) is then feed to the Modulation Factor Calculator 8530-1. The Modulation Factor Calculator 8530-1 selects the maximum among the four time-integrated excursion magnitudes (Hu0, Hu1, Hv0, Hv1) and generates a non-linearly normalized scalar control signal E(n) with a continuous range [0,1].

The Modulation Factor Calculator 8530-1 outputs the non-linearly normalized scalar control signal E(n) to modulate the mixing of F(n) and G(n). A small value of E(n) implies history of small excursions and large value of E(n) implies history of large excursions.

Thus, the mixing of F(n) and G(n) under the control of scalar control signal E(n) to generate and output Compensation Transform C(n) is based on the history of compensation window excursions. This exemplary embodiment provides good stabilization without frequent over-excursions and has a known frequency response and predictable stabilization characteristics, suitable for real time video stabilization.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of processing video data, comprising:
   identifying, from transforms of motion vectors between video frames captured by a camera, a compensation transform representing camera movement to be compensated; and
   adaptively filtering the compensation transform to prevent excessive over-excursion of a compensation window modeled from an output video frame and superimposed over a captured video frame, based on normalized time-integrated excursions of the compensation window,
   wherein the compensation window is rotated, shifted, or scaled with respect to the captured video frame,
   wherein the adaptively filtering includes a scalar combination of:
   a highly frequency-selective high-order linear time-invariant recursive filter performing strong compensation (SC) filtering of the compensation transform; and a lower frequency-selective high-order or lower-order linear time-invariant recursive filter performing weak compensation (WC) filtering of the compensation transform.

2. The method of claim 1, wherein the adaptively filtering includes:
   assigning a larger influence of the SC filter for the current frame based on small excursion history; and
   assigning a larger influence of the WC filter for the current frame for large excursion history.

3. The method of claim 1, wherein the normalized time-integrated excursions comprises:
   selecting a maximum magnitude M(n) among a plurality of time-integrated excursion magnitudes of excursion-history.

4. The method of claim 1, wherein the SC filtering is set at a cutoff frequency lower than cutoff frequency set for WC filtering.

5. The method of claim 1, wherein the normalized time-integrated excursions are non-linearly normalized time-integrated excursions.

6. The method of claim 2, further including assigning proportional influences of the SC filter and the WC filter for an excursion history of medium excursions.

7. The method of claim 2, wherein the assigning of influence to the SC filter and the WC filter is based on a non-linearly normalized value within a continuous range from zero to one.

8. The method of claim 3, wherein E(n) is non-linearly normalized value of M(n) within a range [0,1], from history of small excursions to large excursions.

9. The method of claim 4, wherein the SC filtering includes use of a sharper rolloff than the rolloff in WC filtering.

10. The method of claim 4, wherein the SC filtering has a cutoff frequency at about 1 Hz.

11. A video processing circuit, comprising:
a receiver configured to receive a plurality of sequential frames of video data;
a memory configured to store a first group of motion vectors obtained from the sequential frames and having a first motion characteristic and a second group of motion vectors obtained from the sequential frames and having a second motion characteristics;
a transform selector configured to identify from transforms of the first and second groups of motion vectors a compensation transform representing camera movement to be compensated; and
an adaptive filter configured to filter the compensation transform, to prevent excessive over-excursion of a compensation window modeled from an output video frame and superimposed over an input video frame, based on normalized time-integrated excursions of the compensation window,
wherein the compensation window is rotated, shifted, or scaled with respect to the input video frame;
further including a mixer configured to combine a higher frequency-selective high-order linear time-invariant filter performing strong compensation (SC) filtering of the compensation transform, and a lower frequency-selective lower-order linear time-invariant filter performing weak compensation (WC) filtering of the compensation transform.

12. The circuit of claim 11, wherein the adaptive filter is further configured to assign a larger influence of the SC filter for the current frame based on an excursion history of small excursions, and assigning a larger influence of the WC filter for the current frame for an excursion history of large excursions.

13. The circuit of claim 11, further including a modulation factor calculator to calculate a maximum magnitude among a plurality of time-integrated excursion magnitudes of excursion-history to output a non-linearly normalized signal.

14. The circuit of claim 11, wherein the adaptive filter is configured to retain excursion history by use of recursive filters.

15. The circuit of claim 11, wherein transforms of the first group of motion vectors represent motion of selected feature points and transforms of the second group of motion vectors represent motion of non-overlapping tiles divided from a video frame.

16. The circuit of claim 11, wherein the normalized time-integrated excursions are non-linearly normalized time-integrated excursions.

17. The circuit of claim 12, wherein the SC filter is set at a cutoff frequency lower than cutoff frequency set for WC filter.

18. The circuit of claim 17, wherein the SC filter includes use of a sharper rolloff than the rolloff in the WC filter.

19. The circuit of claim 13, wherein the non-linearly normalized signal is input to the mixer to modulate the mixing of the SC filter and the WC filter with a scalar value within a range from zero to one.

20. A camera comprising:
an image sensor configured to capture a video sequence of images; an image data circuit configured to convert the captured sequence of images into frames of video data;
an image processing circuit, comprising:
a receiver configured to receive the frames of video data;
a motion vector detector configured to detect motions of objects in the frames and generate motion vectors between the frames;
a transform selector configured to identify from transforms of the motion vectors a compensation transform representing camera movement to be compensated;
an adaptive filter configured to filter the compensation transform to prevent over-excursion of a compensation window;
a compensation unit configured to adjust at least one of the frames based on the compensation transform and the output of the adaptive filter; and
a modulation factor calculator to calculate a maximum magnitude among a plurality of time-integrated excursion magnitudes of excursion-history to output a non-linearly normalized signal;
further including a mixer configured to combine a higher frequency-selective high-order linear time-invariant filter performing strong compensation (SC) filtering of the compensation transform, and a lower frequency-selective lower-order linear time-invariant filter performing weak compensation (WC) filtering of the compensation transform.

21. The camera of claim 20, further including a grouping circuit configured to group the motion vectors into one of at least two groups including a feature point group and a tile group, the tile group comprising non-overlapping tiles divided from a video frame.

22. The camera of claim 20, wherein the transform selector is configured to identify the compensation transform based on a plurality of scoring functions selected from History, Motion, Feature, and Extent scores.

23. The camera of claim 20, wherein the adaptive filter is configured to prevent excessive over-excursion of a compensation window based on non-linearly normalized time-integrated excursions.

24. The camera of claim 20, wherein the adaptive filter is configured to retain excursion history by use of recursive filters.

* * * * *